(12) United States Patent
Botnmark et al.

(10) Patent No.: US 7,879,227 B2
(45) Date of Patent: Feb. 1, 2011

(54) SCREEN CONDITION CHECKING APPARATUS AND METHOD

(75) Inventors: Ketil Botnmark, Narvik (NO); Kjell Mikalsen, Narvik (NO)

(73) Assignee: 2K Tech AS, Narvik (NO)

( * ) Notice: Subject to any disclaimer, the term of this patent is extended or adjusted under 35 U.S.C. 154(b) by 428 days.

(21) Appl. No.: 11/912,301

(22) PCT Filed: Apr. 20, 2006

(86) PCT No.: PCT/NO2006/000146

§ 371 (c)(1),
(2), (4) Date: Mar. 11, 2008

(87) PCT Pub. No.: WO2006/112728

PCT Pub. Date: Oct. 26, 2006

(65) Prior Publication Data

US 2008/0196943 A1    Aug. 21, 2008

(30) Foreign Application Priority Data

Apr. 20, 2005   (NO) .................................. 20051931

(51) Int. Cl.
*B01D 35/14*     (2006.01)
*B01D 35/143*    (2006.01)
*B01D 35/22*     (2006.01)
*B01D 39/10*     (2006.01)

(52) U.S. Cl. ........................... 210/90; 210/85; 210/767; 73/64.56; 73/865.8

(58) Field of Classification Search ................ 73/54.01, 73/61.41, 61.42, 61.43, 64.56; 210/85, 90, 210/767

See application file for complete search history.

(56) References Cited

U.S. PATENT DOCUMENTS

| | | | |
|---|---|---|---|
| 3,563,255 A | | 2/1971 | Morris |
| 4,395,338 A | * | 7/1983 | Rowton ....................... 210/747 |
| 4,413,511 A | * | 11/1983 | Godbey ................... 73/152.42 |
| 4,534,869 A | * | 8/1985 | Seibert ........................ 210/788 |
| 4,535,851 A | * | 8/1985 | Kirkpatrick et al. ........... 175/38 |
| 4,557,142 A | * | 12/1985 | Hensley et al. ........... 73/152.19 |
| 4,635,735 A | * | 1/1987 | Crownover ................... 175/48 |
| 4,878,382 A | * | 11/1989 | Jones et al. ............. 73/152.04 |
| 5,252,554 A | * | 10/1993 | Mueller et al. .............. 507/138 |
| 5,582,727 A | | 12/1996 | Foster |
| 5,641,070 A | | 6/1997 | Seyffert |
| 5,814,230 A | * | 9/1998 | Willis et al. ................. 210/710 |
| 6,110,367 A | | 8/2000 | Jensen et al. |
| 6,244,362 B1 | * | 6/2001 | Williams ..................... 175/206 |
| 6,267,893 B1 | * | 7/2001 | Luxemburg ................. 210/723 |
| 7,275,377 B2 | * | 10/2007 | Kates ........................... 62/129 |
| 7,363,829 B2 | * | 4/2008 | Rieberer ................... 73/863.23 |
| 2002/0127860 A1 | * | 9/2002 | Vanell ......................... 438/689 |

(Continued)

*Primary Examiner*—David A. Rogers
(74) *Attorney, Agent, or Firm*—Knobbe Martens Olson & Bear, LLP

(57) ABSTRACT

An apparatus for the condition checking of a screen cloth in a vibrating screen for drilling fluid, comprising a pump for drawing a drilling fluid sample from the bottom tray of the vibrating screen into the apparatus, a filter for filtering the drilling fluid sample, and a pressure gauge for measuring the pressure difference across the filter. A method for the condition checking of a screen cloth in a vibrating screen, comprising drawing a drilling fluid sample from the bottom tray of the vibrating screen, filtering the drilling fluid sample through a filter, and measuring the pressure difference across the filter.

21 Claims, 4 Drawing Sheets

U.S. PATENT DOCUMENTS

| | | | |
|---|---|---|---|
| 2004/0154834 A1* | 8/2004 | Risher et al. | 175/66 |
| 2005/0183994 A1* | 8/2005 | Hensley et al. | 209/238 |
| 2007/0187317 A1* | 8/2007 | Graetz et al. | 210/321.6 |
| 2007/0187328 A1* | 8/2007 | Gordon | 210/650 |
| 2008/0164068 A1* | 7/2008 | Burkhard | 175/66 |

* cited by examiner

SCREEN CONDITION CHECKING APPARATUS AND METHOD

CROSS REFERENCE TO RELATED APPLICATIONS

This application claims the benefit and priority to and is a U.S. National Phase of PCT International Application Number PCT/NO2006/000146, filed on Apr. 20, 2006, which claims priority to Norwegian Application No. 20051931 filed Apr. 20, 2005. The disclosures of the above-referenced application is hereby expressly incorporated by reference in its entirety.

The present invention relates to an apparatus and a method for checking screen cloths in a vibrating screen for drilling fluid.

In recent years, new designs of vibrating screens, or so-called shale shakers, have resulted in the vibrating screens becoming more compact in configuration than earlier. The aim is to obtain maximum screen area in minimum space. This is achieved to some extent by providing minimal space between the top and the bottom screen cloths, by placing the bottom screen cloth as far down towards the bottom as possible (partly covered by drilling fluid/mud), by having inclined screens etc. Other changes in design have been to cover the vibrating screens as much as possible in order to reduce noise and evaporation in the shaker room. All these changes have reduced and complicated the operators' possibilities of checking the condition of the screen cloths during operation.

The alternative for the operators is to remove the screen cloths for checking during a shutdown of pumps (connections etc.). As a rule, the operators at that time are busy on the drilling deck, which means that this is difficult to do. The checking must then be carried out during operation, that is to say that the vibrating screen is stopped and the flow of drilling fluid must be distributed across the other vibrating screens. This results in the flow of drilling fluid across the vibrating screens being variable and capacity not being utilised 100%. Furthermore, it takes a great deal of operator time, and a rapid, visual checking of wet screen cloths is not reliable.

The object of the present invention is to provide an apparatus and a method for checking the condition of the vibrating screens.

Therefore, according to the invention there is provided an apparatus and a method for the condition checking of screen cloths in a vibrating screen for drilling fluid. The apparatus is characterised in that it comprises a pump for drawing drilling fluid from the bottom tray of the vibrating screen into the apparatus, a filter for filtering the drilling fluid and a pressure gauge for measuring the differential pressure across the filter. Advantageous features of the apparatus according to the invention are set forth in dependent patent claims 2 and 3.

Furthermore, the method is characterised in that it comprises drawing a drilling fluid sample from the bottom tray of the vibrating screen, filtering the drilling fluid sample through a filter and measuring the pressure difference across the filter. Advantageous features of the method according to the invention are set forth in dependent patent claims 5 and 6.

One advantage of the apparatus according to the invention is that it will be capable of assuring the quality of the drilling fluid in that screen cloth failure is detected at an early stage. It will be possible to reduce mud drilling fluid completion costs, additive materials, wear on pump lines and nozzles in the drill bit, and on other equipment that is subjected to abrasive wear.

Furthermore, the apparatus and the method according to the invention will be able to reduce the time spent by personnel in the harmful atmosphere of the shaker room. Periods of time spent in the shaker room for checking screen cloths and for the sampling of drilling fluid are eliminated, and only time for sampling cuttings, necessary screen cloth changes and other periodic checking of equipment will require periods in the shaker room. This will also free time for the drilling personnel to carry out other tasks. A reduction of exposure time for the operators in the shaker room environment is an advantage since building-in and better ventilation have not reduced mist and vapour emissions from drilling fluid and noise from the vibrating screens to a satisfactory extent. Furthermore, the recent increase in the use of chemicals in drilling fluid has resulted in a greater risk of allergic reactions upon exposure. Exposure will be reduced substantially by using the apparatus and method according to the present invention.

The invention will now be described in more detail by means of examples, and reference is made to the appended drawings wherein.

Figure 1:
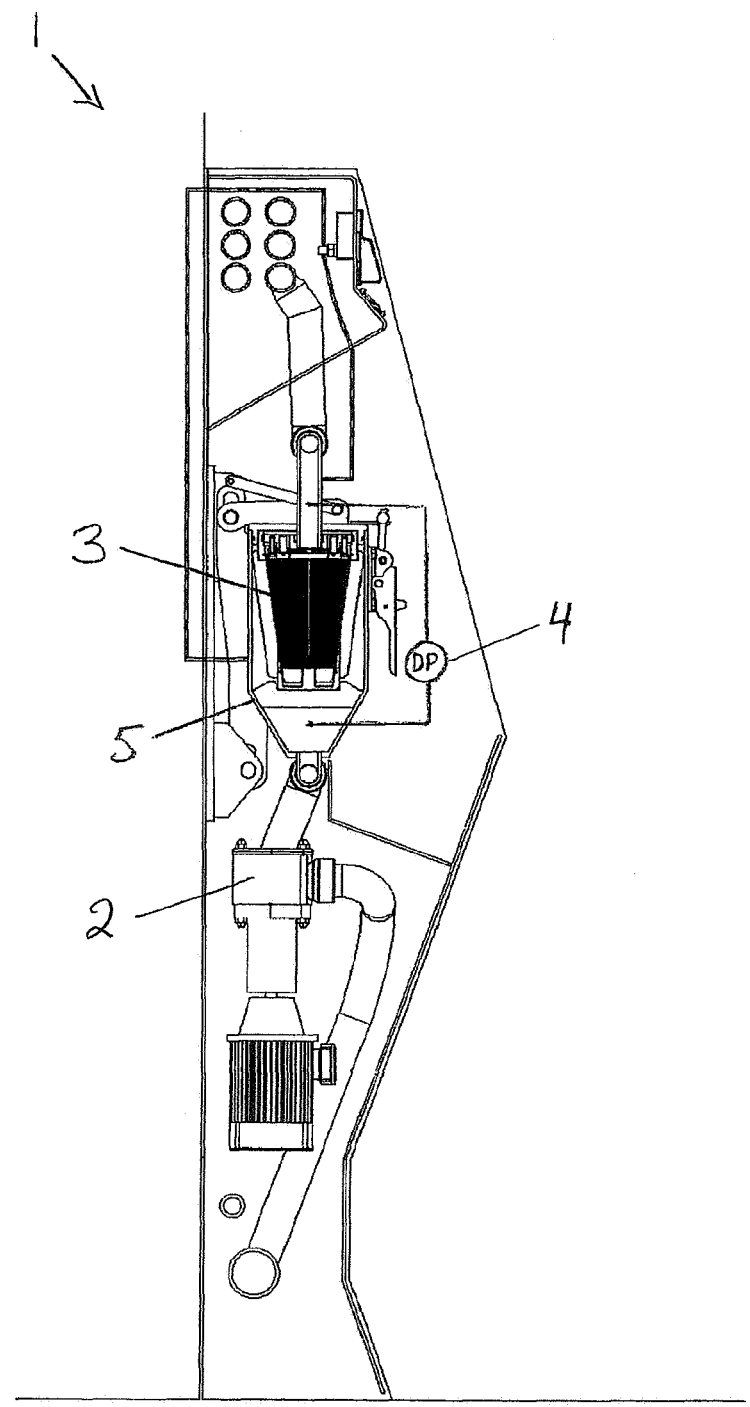
FIG. 1 is a longitudinal cross-sectional view of the apparatus according to the invention.

FIG. 1 is a longitudinal sectional view of the apparatus 1 according to the invention. The apparatus 1 comprises a pump 2 for drawing drilling fluid from the bottom tray of the vibrating screen into the apparatus 1, a filter 3 for filtering the drilling fluid and a pressure gauge 4 for measuring the differential pressure across the filter. The filter 3 is mounted in a filter housing 5.

The apparatus is connected to the vibrating screen so that when the pump 2 is started, a small representative portion of the ready-filtered drilling fluid is continuously pumped from the bottom tray beneath the vibrating screen. The drilling fluid sample is pumped via a pipeline to the apparatus 1 and then through the filter 3. The filter 3 has the same or a greater mesh size than the screen cloth in the vibrating screen. The pressure difference across the filter 3 is constantly monitored. If particles over a certain size enter the filter 3 (because of holes in the screen cloth), the filter 3 is gradually blocked and the differential pressure increases. The pressure difference can then be read on a warning device (not shown) which gives a signal, visual or acoustic, indicating that there are changes in the drilling fluid. The signal can be transmitted to, for example, the driller's cabin, and then the condition of the screen cloth of the respective vibrating screen can be checked.

Findings from tests carried out by the inventors have shown that small particles in the filter give unambiguous signals of the differential pressure. If the drilling fluid sample contains particles greater than the mesh size of the screen cloth in the vibrating screen, the filter 3 will gradually be blocked and the pressure difference across the filter 3 will increase. This can then be read on instruments connected to the apparatus 1. Such a system gives fast and unambiguous signals of screen failure.

The filter 3 may be in the form of a truncated cone as shown in FIG. 1, or the filter 3 may be configured as a disc or a cylinder. The filter 3 must be configured and arranged so that the filter housing 5 is divided into two chambers separated by the filter 3 and so that the differential pressure across the filter 3 can be measured.

Figure 2:
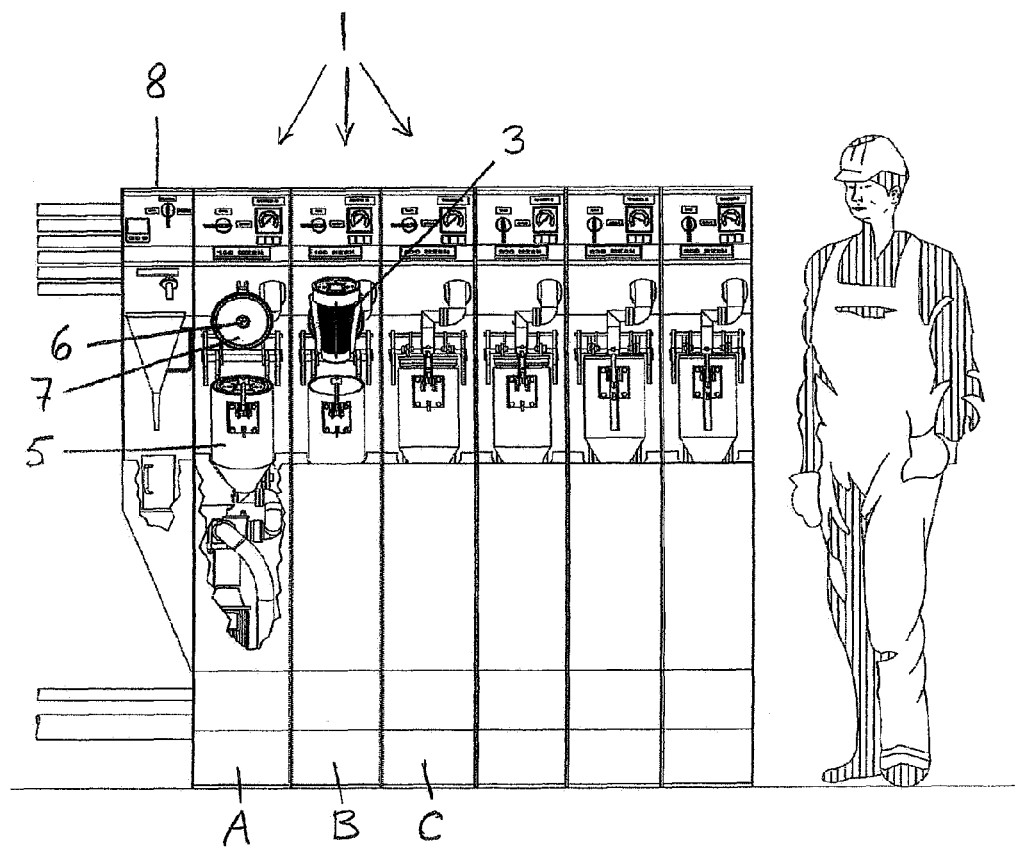
FIG. 2 is a front view of the apparatus.
Figure 3:
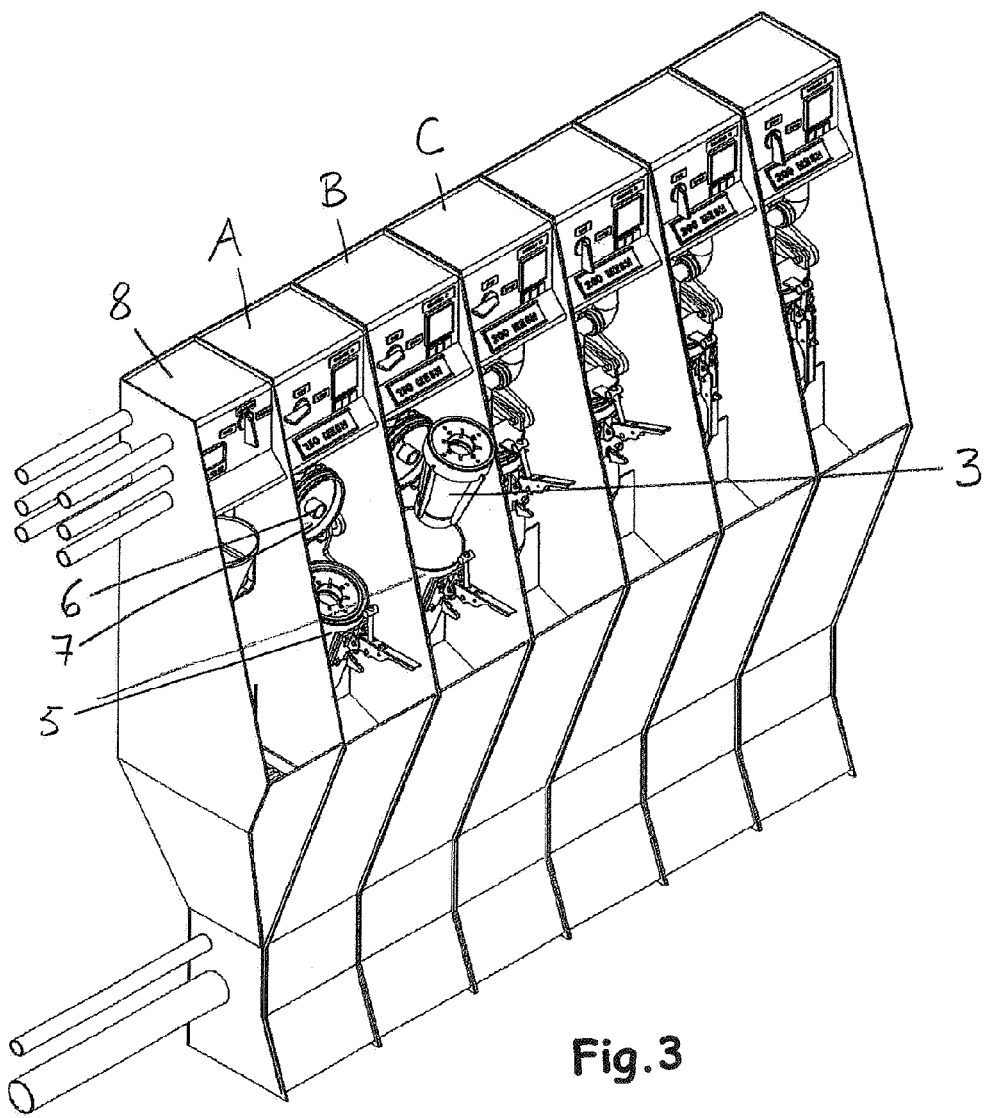
FIG. 3 is a perspective view of the apparatus.

The apparatus 1 can advantageously be arranged in a rack as shown in FIGS. 2 and 3. Each vibrating screen is connected to its respective apparatus 1. The apparatuses 1 in FIGS. 2 and 3 are designated A, B, and C. An advantageous example of the operation of the apparatus 1 will be described below with reference to FIGS. 2 and 3.

Each apparatus 1 consists of a filter housing 5, a filter 3, a pump 2 with separate ventilation, and monitoring and control equipment. These are operated independently of each other and can be run with different filter inserts depending on the type of screen cloth that is in the corresponding vibrating screen.

During normal operation, the filter housing 5 and the filter 3 are in a vertical position in the apparatus 1. Drilling fluid is drawn through inlet pipe 6 (typically about 1" (2.54 cm) in diameter) mounted in the cover 7 over the filter housing 5. The cover 7 surrounds the filter 3 and the filter housing 5 and forms a liquid and gas-proof connection between them. The drilling fluid is drawn into the filter 3 (about 30 to 50 l/min) by the suction pump 2 which is mounted on the outlet side of the filter. When the differential pressure across the filter 3 increases, or other factors dictate that the filter 3 must be checked/replaced, the pump 2 is closed off and the pressure across the filter 3 is balanced by allowing air in.

The filter housing 5 is opened by opening an eccentric lock on the front of the filter housing. This lowers the filter housing 5 so that it is released from the cover 7 (apparatus A). The housing 5 is tilted towards the operator. The cover 7 is opened and the filter 3 is accessible for inspection or replacement. When the filter 3 is to be replaced, it is pulled right out of the filter housing (apparatus B). Excess drilling fluid can then run down into the tray beneath the filter housing 5, thereby avoiding spill on the floor. A new filter insert can be inserted and the unit closed and started in reverse order. During the running of hot drilling fluid, suction across each apparatus 1 will ensure that the operator is not exposed to steam from an open filter housing.

A sampling device 8 is located at the side of the control unit. The sampling device 8 is a ventilated unit having means for taking samples of the cleaned drilling fluid (from any vibrating screen or pit) to carry out necessary tests and analyses. In FIGS. 2 and 3 this is illustrated by direct drawing-off to a funnel viscosimeter.

This reduces the exposure time to off-gases from drilling fluid for the drill operators and mud engineers who thus do not need to go into the shaker room to take samples from ducts and pit. (For example, S.G. samples which are taken every fifteen minutes during drilling.)

Furthermore, the drawing-off equipment is in the immediate vicinity of the testing apparatuses that are used, thereby avoiding unnecessary spill on gangways.

Figure 4:
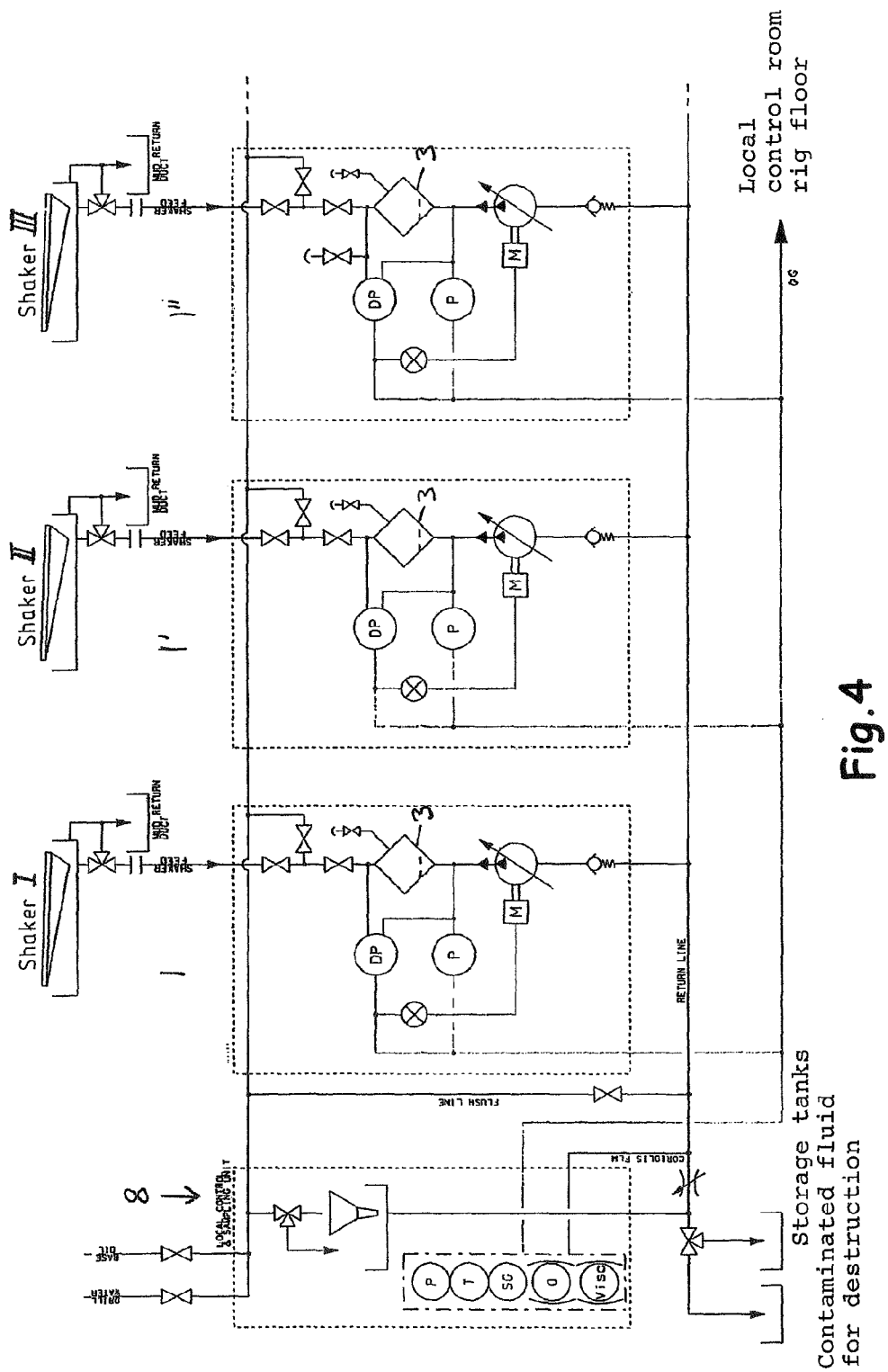
FIG. 4 is a flow diagram of the apparatus.

FIG. 4 shows a flow diagram for apparatuses 1, 1' 1" and sampling device 8. P denotes a pressure gauge, whilst DP denotes a pressure gauge for measuring differential pressure/pressure difference across the filter 3. M represents a pump motor.

The sampling device 8 is a unit with means for taking samples from the cleaned drilling fluid from any vibrating screen in order to conduct the necessary tests and analyses. T denotes temperature measuring; SG denotes measurement of specific gravity. One possibility in the sampling device may be a Coriolis flowmeter which records amount, specific gravity and temperature. Visc. denotes viscosity measurement.

The invention claimed is:

1. An apparatus for checking the condition of a screen for drilling fluid, the apparatus comprising:
   a screen capable of vibrating;
   a bottom tray for receiving fluid from the screen;
   at least one conduit for conveying a sample of the fluid from the bottom tray;
   a filter in fluid communication with the conduit for filtering the fluid sample;
   a pump in fluid communication with the conduit and the filter for drawing the fluid sample from the bottom tray and conveying the sample to the filter; and
   a pressure measuring system operatively coupled to the conduit and configured to measure a differential pressure across the filter, wherein the differential pressure across the filter indicates the condition of the screen.

2. An apparatus according to claim 1, further comprising a warning device operatively coupled to the pressure measuring system, the warning device configured to provide a warning when the differential pressure exceeds a predetermined limit value.

3. An apparatus according to claim 1, further comprising a sampling device comprising at least one of a pressure measuring system, a temperature meter, a specific gravity meter, a viscosity meter, or a Coriolis flowmeter.

4. An apparatus according to claim 1, wherein the filter comprising a mesh size substantially equal to a mesh size of the screen.

5. An apparatus according to claim 1, wherein the filter comprising a mesh size greater than a mesh size of the screen.

6. An apparatus according to claim 1, further comprising a housing having a first chamber and a second chamber.

7. An apparatus according to claim 6, wherein the filter is disposed between the first chamber and the second chamber.

8. An apparatus according to claim 6, wherein the housing is tiltingly coupled to a rack configured to arrange a plurality of apparatuses.

9. An apparatus according to claim 1, further comprising a plurality of apparatuses arranged in a rack, the apparatuses configured to indicate the condition of a plurality of vibration screens.

10. An apparatus according to claim 9, wherein the plurality of apparatuses operate independently of each other.

11. An apparatus according to claim 9, wherein the filter associated with each apparatus is configured to function with the associated screen of the corresponding vibrating screen.

12. A method for checking the condition of a screen for drilling fluid, comprising:
   passing fluid through the screen;
   drawing a fluid sample from the screened fluid;
   filtering the fluid sample through a filter;
   measuring the pressure difference across the filter; and
   comparing the pressure difference to at least one predetermined limit value, wherein the pressure difference indicates the condition of the screen.

13. A method according to claim 12, further comprising warning when the pressure difference across the filter exceeds at least one selected predetermined limit value.

14. A method according to claim 12, further comprising drawing a fluid sample into the sampling device for measuring at least one of temperature, pressure, specific gravity, or viscosity of the fluid sample.

15. A method according to claim 12, wherein the filter comprising a mesh size substantially equal to a mesh size of the screen.

16. A method according to claim 12, wherein the filter comprising a mesh size greater than a mesh size of the screen.

17. A method according to claim 12, further comprising collecting in the filter particulates larger than a mesh size of the screen, the collected particulates generating an increased pressure differential across the filter, and indicating a change in the condition of the screen.

18. A method according to claim 12, wherein the filter is disposed between a first chamber and a second chamber of a housing.

19. A method according to claim 12, further comprising arranging a plurality of condition checking apparatuses in a rack, and configuring the apparatuses to indicate the condition of a plurality of vibration screens.

20. A method according to claim 19, wherein the plurality of apparatuses are operated independently of each other.

21. A method according to claim 19, further comprising providing a different filter to each apparatus depending on the type of screen associated with the corresponding vibrating screen.

* * * * *